(12) United States Patent
Higuchi

(10) Patent No.: US 7,387,056 B2
(45) Date of Patent: Jun. 17, 2008

(54) SLIDE COMPOUND SAWS

(75) Inventor: Hisashi Higuchi, Kariya (JP)

(73) Assignee: Makita Corporation, Anjo-shi, Aichi-ken (JP)

( * ) Notice: Subject to any disclaimer, the term of this patent is extended or adjusted under 35 U.S.C. 154(b) by 0 days.

(21) Appl. No.: 10/163,636

(22) Filed: Jun. 7, 2002

(65) Prior Publication Data
US 2003/0226436 A1  Dec. 11, 2003

(51) Int. Cl.
*B26D 1/14* (2006.01)
(52) U.S. Cl. .............................. 83/483; 83/485; 83/490
(58) Field of Classification Search .......... 83/483–490, 83/471–477.1, 581, 635, 829
See application file for complete search history.

(56) References Cited

U.S. PATENT DOCUMENTS

| | | | |
|---|---|---|---|
| 4,587,875 A * | 5/1986 | Deley | 83/471.3 |
| 4,869,142 A | 9/1989 | Sato et al. | |
| 5,054,352 A | 10/1991 | Fushiya et al. | |
| 5,146,825 A * | 9/1992 | Dehari | 83/486.1 |
| 5,241,888 A * | 9/1993 | Chen | 83/471.3 |
| 5,524,516 A | 6/1996 | Sasaki et al. | |
| 5,768,967 A * | 6/1998 | Sasaki et al. | 83/471.3 |
| 5,791,224 A * | 8/1998 | Suzuki et al. | 83/488 |
| 5,870,939 A * | 2/1999 | Matsubara | 83/471.3 |
| 6,170,373 B1 * | 1/2001 | Sasaki et al. | 83/485 |
| 6,550,363 B2 * | 4/2003 | He | 83/471.3 |
| 2002/0144582 A1 | 10/2002 | He | |

FOREIGN PATENT DOCUMENTS

| | | |
|---|---|---|
| JP | 11-90730 | 4/1999 |
| JP | 2000402605 | 1/2000 |
| JP | 2002200601 | 7/2002 |
| WO | WO83/03569 | 10/1983 |

* cited by examiner

*Primary Examiner*—Stephen Choi
(74) *Attorney, Agent, or Firm*—Dennison, Schultz & MacDonald

(57) ABSTRACT

Slide compound saws (1, 100, 150) may include a table (3*b*) defining a table surface. A saw unit (20) may be pivotable relative to the table surface. A first slide bar (31, 51, 251, 351) may be slidably coupled to the table and may be disposed substantially in parallel with the table surface. The first slide bar may define a first sliding distance (S1) of the saw unit in a direction substantially parallel to the table surface. A sliding device (24, 33, 52, 61, 62, 252, 352) may slidably couple the first slide bar to the saw unit. The sliding device may define a second sliding distance (S2) of the saw unit in the direction substantially parallel to the table surface. Preferably, the saw unit can slide up to a distance S1 plus S2 in the direction substantially parallel to the table surface.

15 Claims, 8 Drawing Sheets

SLIDE COMPOUND SAWS

BACKGROUND OF THE INVENTION

1. Field of the Invention

The present invention generally relates to slide compound saws, which saws generally include a saw unit that can pivot vertically relative to a table surface and that can slide linearly relative to and along the table surface in order to cut a workpiece.

2. Description of the Related Art

Japanese Laid-open Publication No. 11-90730 and U.S. Pat. No. 5,054,352 teach slide compound saws, in which a saw unit having a circular saw blade can slide relative to a table surface via two slide bars. A workpiece (such as wood) is placed on the table surface, the saw unit is vertically moved (or pivoted) toward the workpiece, and then the saw unit is thereafter moved (or slid) in a direction parallel to the table surface. As a result, a workpiece having a relatively large width can be cut.

In addition, these known slide compound saws include a lock for releasably preventing the saw unit from displacing or sliding along the slide bars. In particular, the lock includes a fixing screw that is designed to abut or press against one of the slide bars. When the fixing screw securely abuts the slide bar, the saw unit can not slide or move linearly with respect to the table surface. However, the saw unit still can be vertically moved or pivoted towards the table surface in order to cut the workpiece. Thus, when the fixing screw securely abuts the slide bar, the slide compound saw functions as a usual power circular saw. On the other hand, when the fixing screw does not abut the slide bar, the saw unit can slide parallel to the table surface in order to cut a relatively wide workpiece.

SUMMARY OF THE INVENTION

It is, accordingly, one object of the present invention to teach improved slide compound saws. For example, in one aspect of the present teachings, the saw unit of a slide compound saw may have an increased moving or sliding distance without an accompanying increase in the size of the table or the slide bar(s). In another aspect of the present teachings, at least two discrete slidable ranges may be provided.

According to another aspect of the present teachings, slide compound saws are taught that may include a table defining a table surface. A saw unit may be pivotally coupled to the table and may pivot vertically, and/or at a bevel angle, relative to the table surface. A first slide mechanism, which may preferably include a first slide bar, preferably permits the saw unit to slide parallel, or substantially parallel, to the table surface in order cut a workpiece placed on the table. Sliding means may be provided in order to extend the sliding distance or range of the saw unit relative to the table without requiring an increase in the length of the slide mechanism or the first slide bar. Thus, in this aspect, the movable distance of the saw unit relative to the table can be increased without increasing the size of the table or the first slide mechanism (e.g., including one or more first slide bars).

In another aspect of the present teachings, an arm or a support member may be coupled to the first slide mechanism or first slide bar and may serve to pivotally support the saw unit with respect to the table surface and/or the first slide mechanism (or first slide bar). The arm or support member may be slidably coupled to the first slide mechanism (or first slide bar) or may be fixedly coupled to the slide mechanism (or first slide bar). If the arm or support member is fixedly coupled to the first slide mechanism (or first slide bar), a second slide mechanism (e.g., including a second slide bar) may be slidably coupled to the arm support. In this aspect, the second slide mechanism is preferably disposed in parallel with the first slide mechanism and the second slide mechanism can move or slide relative to the first slide mechanism.

In another aspect of the present teachings, the first slide mechanism (or first slide bar) may slidably move relative to the table. Further, the saw unit also may be slidable relative to the first slide mechanism. Thus, two distinct or separate sliding ranges may be provided by the first slide mechanism.

In another aspect of the present teachings, the first slide mechanism may include an inner slide member (e.g., an inner slide bar) that is slidably inserted into an outer slide member (e.g., an outer slide bar). In this aspect, the first slide mechanism may provide a relatively long sliding distance while occupying a relatively small space (e.g., a relatively short linear distance).

Additional objects, features and advantages of the present invention will be readily understood after reading the following detailed description together with the accompanying drawings and the claims.

DETAILED DESCRIPTION OF THE INVENTION

Figure 1:
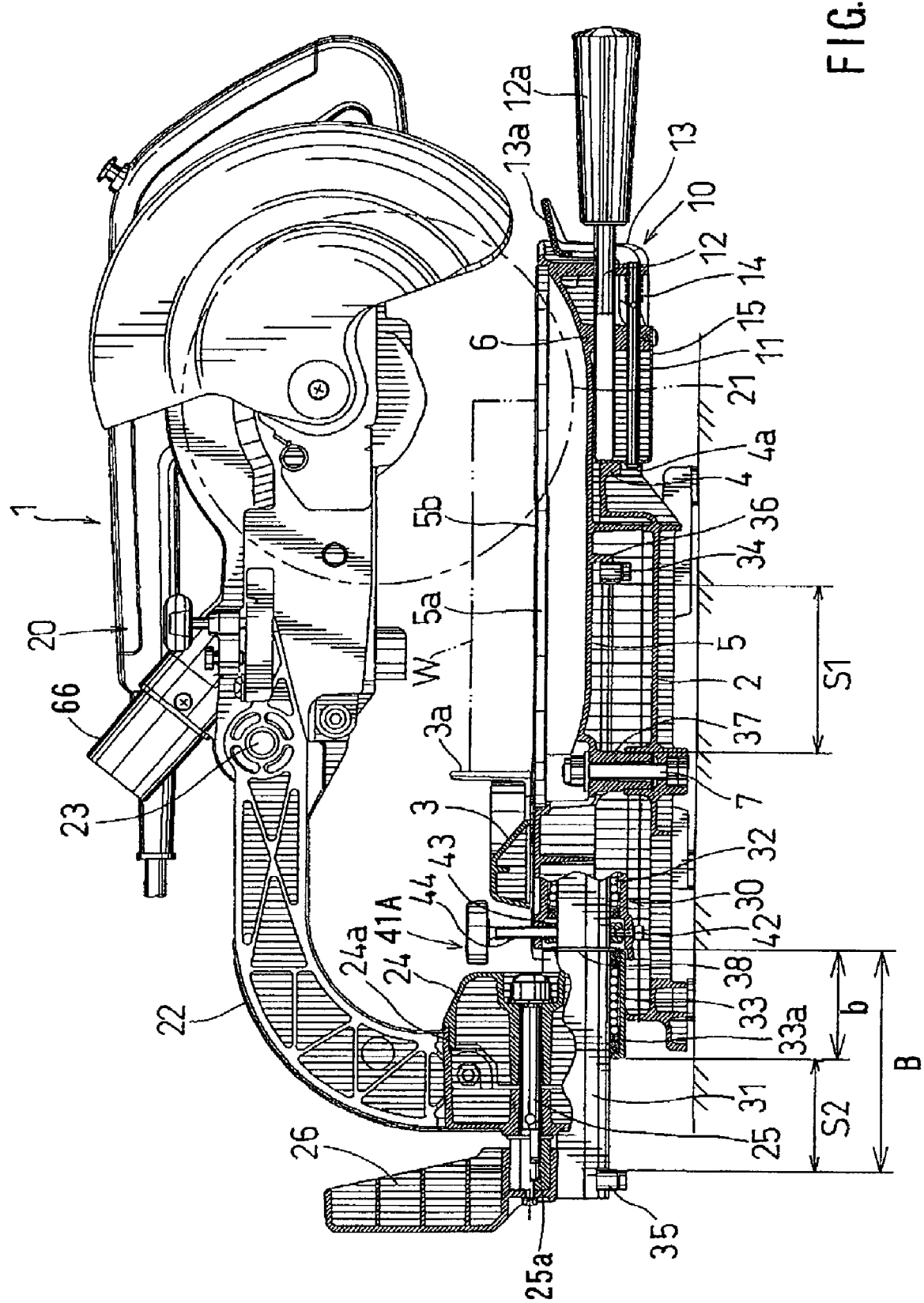
FIG. 1 is a broken-away side view of a first representative slide compound saw.

In one embodiment of the present teachings, slide compound saws may include a table defining a table surface. A turntable optionally may be rotatably disposed within the table. A saw unit may be pivotable relative to the table surface. A first slide bar may be slidably coupled to the table (or turntable) and may be disposed substantially in parallel with the table surface. The first slide bar preferably defines a first sliding distance or range (S1 or A-a) of the saw unit relative to the table in a direction substantially parallel to the table surface. Sliding means may slidably couple the first slide bar to the saw unit. That is, the sliding means preferably permits the saw unit to slide relative to the first slide bar. In addition, the sliding means preferably defines a second sliding distance (S2 or B-b) of the saw unit relative to the first slide bar in the direction substantially parallel to the table surface. In this embodiment, the saw unit is capable of sliding up to a distance S1 plus S2 (i.e., within a range of S1 plus S2) in the direction substantially parallel to the table surface.

The sliding means may include an arm support that rotatably or pivotally supports the saw unit relative to the table (or turntable) and the first slide bar. The arm support may be fixedly secured to the first slide bar or may be slidably coupled to the first slide bar. Optionally, the first slide bar may be disposed below the table surface, although the first slide bar also may be disposed above the table surface.

In another embodiment, the sliding means may be slidably and concentrically disposed within the first slide bar or may be slidably and concentrically disposed around the first slide bar. Preferably, the first slide bar can slide relative to the table (or turntable). Optionally, the sliding means may include a second slide bar slidably and concentrically disposed within or around the first slide bar. In this case, the second slide bar can telescopically slide relative to the first slide bar (or vice versa) in order to permit the saw unit to slide relative to the table by a first slidable distance (i.e., within a first slidable range) of the first slide bar relative to the table (or turntable) and by a second slidable distance (i.e., within a second slidable range) of the second slide bar relative to the first slide bar.

In another embodiment, the sliding means may include an arm support fixedly coupled to the first slide bar and to an upper arm support. A second slide bar may be slidably disposed within the upper arm support. The second slide bar preferably extends substantially parallel to the first slide bar and the second slide bar preferably supports the saw unit.

In other optional embodiments, means may be provided for releasably locking the saw unit in a bevel cutting position relative to the table surface. In addition or in the alternative, a turntable may rotatably couple the first slide bar to the table, thereby enabling miter cutting operations. In addition or in the alternative, slide compound saws may include a pair of first slide bars and/or a pair of second slide bars.

In another embodiment of the present teachings, slide compound saws may include a table defining a table surface and a saw unit having a saw blade. A first slide bar may be slidably coupled to the table. A second slide bar may slidably couple the first slide bar to the saw unit. The first slide bar is preferably disposed substantially parallel to the second slide bar. In addition, the saw unit preferably slides in a direction substantially parallel to the table surface via the first and second slide bars.

An arm support may be coupled (e.g., fixedly coupled or movably coupled) to the second slide bar and may include means for laterally pivoting the saw unit relative to the table surface, thereby enabling bevel cutting operations. In addition or in the alternative, the arm support may be fixedly coupled to the first slide bar. In addition or in the alternative, the second slide bar may be slidably disposed within or around the first slide bar, such that the second slide bar telescopically extends from the first slide bar or vice versa.

In another embodiment, the second slide bar may be slidably disposed within the arm support. In addition or in the alternative, at least two first slide bars may extend substantially in parallel to each other. In addition or in the alternative, the arm support may include means (e.g., a hinge) for pivoting the saw unit towards the second slide bar (and the table surface). In addition or in the alternative, means may be provided for laterally inclining the saw unit relative to the second slide bar (and the table surface) in order to enable bevel cutting operations.

In another embodiment, linear ball bearings may slidably support the first slide bar(s) and/or the second slide bar(s). In addition or in the alternative, a first set of stoppers may define a first discrete slidable distance (or range) of the first slide bar relative to the table and/or a second set of stoppers may define a second discrete slidable distance (or range) of the second slide bar relative to the arm support.

In another embodiment of the present teachings, slide compound saws may include a table having a table surface and a saw unit rotatably supporting a circular saw blade. First and second slide mechanisms may be arranged and constructed to permit the saw unit to move or slide in a direction substantially parallel to the table surface. A first slide bar may be slidably supported by the table (or a turntable rotatably disposed within the table). An arm holder may support the saw unit and may be slidably coupled to the first slide bar. The first slide mechanism may slidably couple the table (or the turntable) to the first slide bar and the second slide mechanism may slidably couple the first slide bar to the arm holder. Optionally, means (e.g., a hinge) also may be provided for pivoting the saw unit relative to the arm holder and/or for laterally inclining the saw unit relative to the arm holder in order to enable bevel cutting operations.

In another embodiment of the present teachings, slide compound saws may include a table having a table surface and a saw unit rotatably supporting a circular saw blade. First and second slide mechanisms may be arranged and constructed to permit the saw unit to move in a direction substantially parallel to the table surface. A first slide bar may be slidably supported by the table (or a turntable rotatably disposed within the table). An arm holder may be supported on the first slide bar. A second slide bar may be supported on the arm holder. The saw unit may be coupled to the second slide bar. The first slide mechanism may slidably couple the table (or a turntable) to the first slide bar and the second slide mechanism may slidably couple the arm holder to the second slide bar. Optionally, means (e.g., a hinge) may be provided for pivoting the saw unit relative to the second slide bar and/or for laterally inclining the saw unit relative to the first slide bar in order to enable bevel cutting operations.

In another embodiment of the present teachings, methods for sliding a saw unit relative to a table (or turntable) are taught. For example, such methods may include sliding a first slide mechanism relative to the table (or turntable) along or within a first (discrete) slidable distance (or range) in a direction substantially parallel to a surface of the table. Optionally, the position of the first slide mechanism may then be fixed or locked relative to the table. A second slide mechanism may then be slid relative to the first slide mechanism along or within a second (discrete) slidable distance (range) in substantially the same direction as the first slide mechanism (e.g., substantially parallel to the first slide mechanism). Further, the position of the second slide mechanism optionally may then be fixed or locked relative to the first slide mechanism.

In another representative method for sliding a saw unit relative to a table (or turntable), a first slide bar may be slid relative to the table (or turntable) along or within a first (discrete) slidable distance (or range) in a direction substantially parallel to a surface of the table. Then, the position of the first slide bar optionally may be fixed or locked relative to the table (or turntable). The saw unit may then be slid relative to a second slide mechanism (e.g. a second slide bar) along or within a second (discrete) slidable distance (or range) in substantially the same direction as the first slide bar (e.g., substantially parallel to the first slide bar). Further, the position of the saw unit optionally may be fixed or locked relative to the second slide mechanism (or second slide bar).

Each of the additional features and teachings disclosed above and below may be utilized separately or in conjunction with other features and teachings to provide improved slide compound saws and methods for designing and using such slide compound saws. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative example and the dependent claims may be combined in ways that are not specifically enumerated in order to provide additional useful embodiments of the present teachings.

Figure 2:
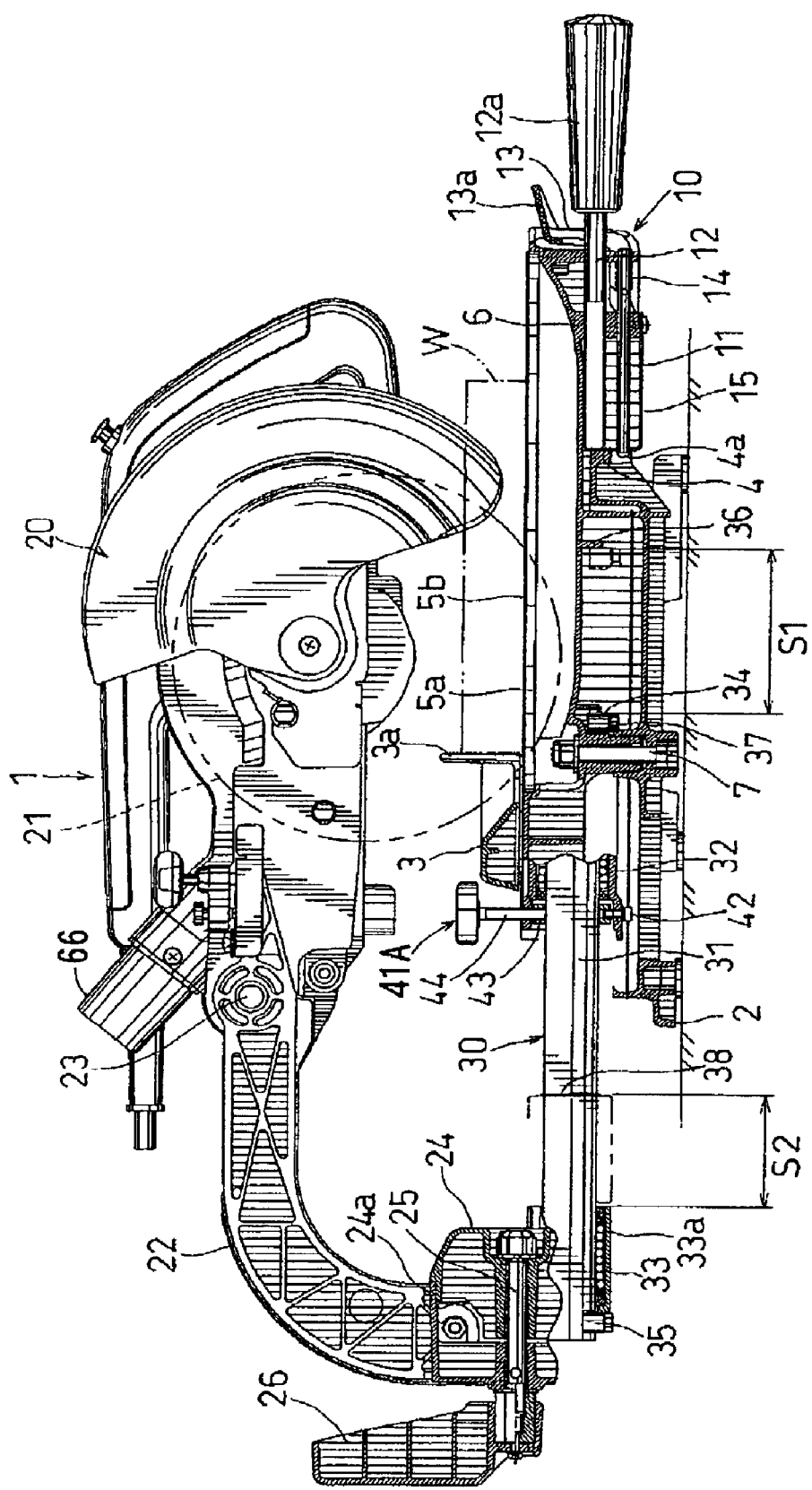
FIG. 2 is a view similar to FIG. 1, but instead, showing the saw unit moved or shifted to its leftward position.
Figure 3:
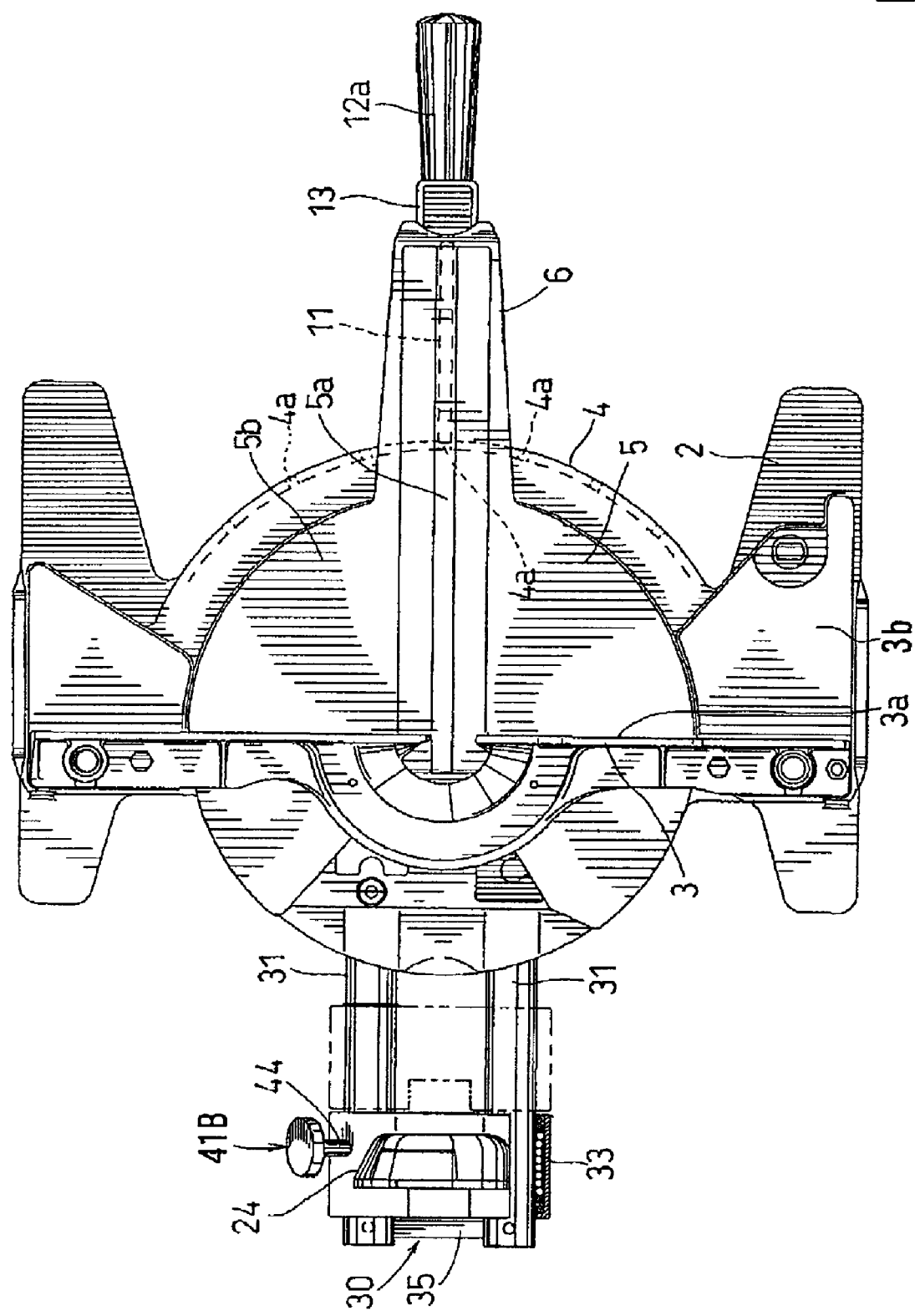
FIG. 3 is a plan view of FIG. 1, in which the saw unit and its associated support arm have been omitted for the purpose of illustration.

A first representative embodiment of a slide compound saw 1 according to the present teachings will now be described with reference to FIGS. 1 to 3. As shown in FIGS. 1 to 3, slide compound saw 1 may generally include a base 2, a table 3b and a turntable 5 rotatably mounted on or within the base 2 and/or table 3b. Preferably, an upper surface 5b of the turntable is flush (or substantially flush) with the upper surface of the table 3b. A circular saw unit 20 may be pivotally disposed above the turntable 5.

The circular saw unit 20 is preferably designed to cut a workpiece W that is supported by the table 3b and/or the turntable 5. For example, the workpiece W may be placed on the upper surface 5b of the turntable 5 and one side of the workpiece W preferably contacts a substantially vertically-oriented surface 3a of a fence 3. That is, the fence 3 preferably extends substantially perpendicularly from the table surface and the turntable surface 5b. Then, a workpiece holder or vice (not shown) optionally may fixedly hold or retain the workpiece W against the upper surface of the table 3b, so that the workpiece W can be fixed in position relative to the table 3b. With the workpiece W thus fixed in position, the workpiece W can be cut by a circular saw 21 that is rotatably mounted within the saw unit 20 and is rotatably driven by a motor (not shown). In FIGS. 1 and 2, the saw unit 20 is shown in the lowermost pivot (i.e., cutting) position.

A blade receiving slot 5a is preferably defined within the turntable 5 for receiving a lower portion of the saw blade 21 during the cutting operation of the workpiece W. As shown in FIG. 3, the blade receiving slot 5a may be at least partially defined within a turntable extension 6 that radially extends outward from the outer periphery of the turntable 5. As also shown in FIG. 3, the fence 3 may be separated into two discrete portions and the two fence portions are preferably disposed on respective sides of the blade receiving slot 5a.

In one application of saw 1, the blade surface of saw blade 21 may be positioned so as to extend substantially perpendicular to the vertically-oriented surface 3a of the fence 3. Therefore, the workpiece W can be cut in a direction perpendicular to the longitudinal direction of the workpiece W. In an optional embodiment, the turntable 5 and the saw unit 20 are preferably designed to rotate together relative to the fence 3. Therefore, an oblique or miter cutting operation can be performed so as to cut the workpiece W obliquely relative to the longitudinal direction of the workpiece W.

In order to enable the oblique or miter cutting operation, the rotational center of the turntable 5 may be positioned just below the central point of the vertically-oriented surface 3a. Thus, as shown in FIGS. 1 and 2, the turntable 5 can rotate about a vertical support shaft 7 that may be positioned below the central point. In this case, the cut angle of the workpiece W may be changed in response to the rotational position of the turntable 5 and the saw unit 20 relative to the vertically-oriented surface 3a of the fence 3.

A turntable lock 10 may serve to releasably fix the turntable 5 in position relative to the base 2 and the table 3b. The turntable lock 10 may include a first lock pin 11 and a second lock pin 12. The first lock pin 11 may serve as a positive lock pin for setting the rotational position of the turntable 5 relative to the base 2. Preferably, a plurality of predetermined rotational positions may be spaced at predetermined angular intervals. For example, as shown in FIG. 3, the base 2 may include a side wall 4 that has a substantially semicircular configuration with respect to the support shaft 7. A plurality of notches 4a may be defined within the side wall 4 at predetermined intervals in the circumferential or peripheral direction. The predetermined intervals may be, e.g., regularly spaced intervals or may be intervals that correspond to the most common angular (miter) cuts performed by the saw 1. When the operator has selected the desired rotational (miter) position, the second lock pin 12 may serve to releasably fix the turntable 5 in the selected (miter) position.

As shown in FIGS. 1 and 2, a spring 14 may bias the first lock pin 11 toward the side wall 4. In this case, the biasing force of the spring 14 will cause the first lock pin 11 to engage the respective notches 4a. An operation lever 13 may include a tab or flange 13a that is operably coupled to the first lock pin 11. Thus, when the operator downwardly presses the tab 13a, the first lock pin 11 is withdrawn or removed from the notches 4a against the biasing force of the spring 14.

The second lock pin 12 may threadably engage the turntable 5. In this case, by rotating the second lock pin 12 in a first direction, the second lock pin 12 will press against the side wall 4 via a pressing plate 15. Therefore, the rotational position of the turntable 5 can be locked with respect to the base 2 and table 3b. The locked state of the turntable 5 can be released by rotating the second lock pin 12 in the opposite (second) direction.

A representative structure for mounting or supporting the saw unit 20 on the turntable 5 will now be described. Referring to FIG. 3, a pair of parallel slide bars (e.g., first slide bars) 31 may be slidably coupled to the turntable 5 and may extend substantially in the horizontal direction. That is, the slide bars 31 preferably extend in a direction that is substantially perpendicular to the vertically-oriented surface 3a. As shown in FIGS. 1 and 2, the left-side portions of the slide bars 31 may be slidably coupled to an arm holder 24. Further, an arm 22 may be supported on the arm holder 24 and the saw unit 20 may be supported by the arm 22. Although two slide bars 31 are utilized in the first representative embodiment, only one slide bar 31 is necessary to provide the function of enabling the saw unit 20 to slide relative to the base 2 and the table 3b.

The arm 22 may extend or project over the slide bars 31 toward a position above the turntable 5. A support rod 23 may be disposed within a front end portion of the arm 22 and the saw unit 20 may pivot about the support rod 23. Thus, the support rod 23 may serve as a hinge and the saw unit 20 can pivot or rotate about the hinge. A return spring (not shown in the first representative embodiment) normally biases the saw unit 20 toward in an uppermost or resting position (an upper stroke end). Therefore, in order to cut a workpiece W, the operator will typically move or pivot the saw unit 20 downward from the uppermost position against the biasing force of the return spring.

In order to enable a bevel cutting operation of the workpiece W (i.e., the saw blade 21 is laterally inclined from a vertically-oriented position relative to the upper surface 5b of the turntable 5), a horizontally-disposed rod 25 may be utilized to permit the arm 22 to pivot laterally relative to the arm holder 24. Further, an arc-shaped guide surface 24a may be defined on the arm holder 24 about the pivotal axis of the arm 22 Therefore, pivotal movement of the arm 22 relative to the arm holder 24 can be prevented when the arm 22 is slidably supported by the arc-shaped guide surface 24a. Optionally, the axis of the horizontally-disposed rod 25 may be positioned, e.g., above the upper surface 5b of the turntable 5 and may be substantially aligned, e.g., with the blade slot 5a.

The horizontally-disposed rod 25 may threadably engage a threaded hole 25a defined within the lower end portion of the arm 22. An operation lever 26 may be attached to one end of the horizontally-disposed rod 25. Therefore, by rotating the operation lever 26 and thus the horizontally-disposed rod 25 in one direction, the arm 22 can be fixed or locked in position relative to the arm holder 24. When the horizontally-disposed rod 25 is rotated in the opposite direction, the arm 22 will be released and will be free to pivot relative to the arm holder 24.

A first slide mechanism 30 may enable the saw unit 20 to linearly move or slide in a direction parallel, or substantially parallel, to the upper surface 5b of the turntable 5 within a first slidable distance (S1). The pair of parallel slide bars 31 may be included within the slide mechanism 30. A pair of first bearing members 32 may slidably support the respective front portions of the slide bars 31 with respect to the turntable 5. For example, the first bearing members 32 may be disposed within the turntable 5 (i.e., below the upper surface 5b of the turntable 5). In this case, the slide bars 31 will slide below the upper surface 5b of the turntable 5. However, in the alternative, the slide bars 31 and the first bearing members 32 also may be disposed above the turntable surface 5b. In either case, the first bearing members 32 preferably include a pair of linear ball bearings for slidably receiving the respective slide bars 31. Thus, the first bearing members 32 may be linear slide bearings.

The arm holder 24 may extend between or across the rear end portions of the slide bars 31. A pair of second bearing members 33 may be disposed within the arm holder 24. The second bearing members 33 may include a pair of linear ball bearings that slidably receive the rear end portions of the respective slide bars 31. Thus, the second bearing members 32 also may be linear slide bearings and preferably slidably support the arm holder 24 with respect to the slide bars 31.

Optionally, each of the slide bars 31 may have a circular, or substantially circular, cross section, although the slide bars 31 may have other configurations. A front tie bar 34 may join the front end portions of the slide bars 31 and a rear tie bar 35 may join the rear end portions of the slide bars 31. Front and rear stoppers 36 and 37 may be defined within the turntable 5 so as contact the front tie bar 34 and define a first (discrete) movable (slidable) range (S1) of the slide bars 31. That is, the distance between the front and rear stoppers 36 and 37 of the first slide mechanism 30 may define the movable or slidable distance (S1) in this embodiment.

However, if the first bearing member 32 is optionally disposed between the first and second stoppers 36 and 37 (not shown), then the slidable distance (S1) will be defined by the distance between the first and second stoppers 36 and 37 minus the length of the first bearing member 32.

The rear stopper 37 may be defined on a boss portion of the turntable 5 that receives the vertically disposed shaft 7. On the other hand, the rear tie bar 35 and stopper rings 38 may be attached to the slide bars 31 at a substantially middle position along the axial direction of the slide bars 31. A second (discrete) movable (slidable) range (S2) of the arm holder 24 relative to the slide bars 31 may be defined by the distance (B) between the rear tie bar 35 and the stopper rings 38 minus the length (b) of the second bearing members 33, because the second bearing members 33 are disposed within the maximum slidable distance (B) of the arm holder 24 relative to the slide bars 32. The second bearing members 33 optionally may be disposed within an outer casing 33a that has a front end (right end as viewed in FIG. 2) that opposes or faces the stopper ring 38 and a rear end (left end as viewed in FIG. 2) that opposes or faces the rear tie bar 35.

Thus, according to the first representative embodiment, the saw unit 20 can move in the horizontal (parallel) direction relative to the turntable 5 along two distinct (i.e., physically separated) sliding ranges. That is, the slide bars 31 may move or slide relative to the turntable within the first slidable range (S1) and the arm holder 24 can further move or slide relative to the slide bars 31 within the second slidable range (S2). Thus, the slide bar 31 can move or slide up to a distance S1 relative to the turntable 5, and the arm holder 24 can move or slide up to a distance S2 relative to the slide bars 31, as shown in FIGS. 1 and 2.

As a result, the combined sliding distance can be increased (e.g., up to S1 plus S2) while still maintaining a compact configuration for the saw 1. That is, it is not necessary to increase the length of slide bars 31 in order to provide a longer sliding range. Further, the sliding movement may be performed in two discrete steps (i.e., first sliding by or up to the distance S1, stopping the sliding movement and then sliding by or up to the distance S2) or the sliding movement along or within the distance S1 plus S2 may be performed in one continuous motion.

Optionally, a first lock mechanism 41A may serve to fix the position of the slide bars 31 relative to the turntable 5. In addition, a second lock mechanism 41B may serve to fix the arm holder 24 in position relative to the slide bars 31. Thus, the position of the saw unit 20 relative to the turntable 5 in the longitudinal direction of the slide bars 31 may be fixed by the first and second lock mechanisms 41A and 41B. Because the first and second lock mechanisms 41A and 41B may be constructed in substantially the same manner, it is only necessary to describe the first lock mechanism 41A in further detail.

The first lock mechanism 41A may include an auxiliary ring 43 that is slidably fitted onto one of the slide bars 31. A stopper screw 42 may be inserted into the turntable 5 from the lower side. In addition, the stopper screw 42 may be screwed or threaded into the auxiliary ring 43 in the diametrical or radial direction so as to fix the auxiliary ring 43 in position relative to the turntable 5. A lock screw 44 may be inserted into the turntable 5 from the upper side and may be screwed into the auxiliary ring 43 in a position opposite to the stopper screw 42. Thus, when the lock screw 44 is tightened, the end or tip portion of the lock screw 44 can abut or contact the outer surface of the slide bar 31, so that the slide bars 31 can be releasably fixed or locked in position relative to the turntable 5.

As noted above, the second lock mechanism 41B may have substantially the same construction as the first lock mechanism 41A. Therefore, the arm holder 24 can be fixed in position relative to the slide bars 31 by tightening a lock screw 44 of the second lock mechanism 41B.

As described above, according to the first representative embodiment, the saw unit 20 may linearly move or slide relative to the turntable 5 along (1) a distance S1 by sliding the slide bars 31 relative to the turntable 5 and (2) a further distance S2 by sliding the arm holder 24 relative to the slide bars 31. Therefore, in order to cut a workpiece W set onto the turntable 5, the operator may first pivot the saw unit 20 downward about the support shaft 23 to cut the front portion of the workpiece W. In this step, the saw unit 20 is preferably positioned at the forward most position (rightmost position as viewed in FIG. 1). The operator may then push the saw unit 20 rearward (leftward as viewed in FIG. 1), so that the workpiece W can be cut along the entire length of the workpiece W in the forward and rearward directions.

As noted above, the saw unit 20 can move or slide by (or up to) the combined distance (S1+S2), in which the distance S1 is the movable or slidable distance of slide bars 31 relative to turntable 5 and the distance S2 is the movable or slidable distance of arm holder 24 relative to the slide bars 31. Thus, two discrete slidable ranges are provided in the first representative embodiment.

Consequently, the movable range of the saw unit 20 may be increased as compared to known compound saws that do not provide the movable or slidable distance S2. Thus, if the movable distance S1 is set to be the same distance as known compound saws, the saw unit 20 may further move or slide by the distance S2 (i.e., the movable distance of the arm holder 24 relative to the slide bars 31), as compared to known compound saws. Naturally, the length of blade slot Sa is preferably defined to be at least about the combined slidable distance S1 plus S2. Consequently, the movable or slidable distance of the saw unit 20 may be increased without increasing the size of the turntable 5, although it may be appropriate to extend the length of the turntable extension 6 in order to provide sufficient length for blade slot 5a. In the alternative, the size or length of the compound saw 1 (e.g., slide bars 31) may be reduced while still providing the same movable or slidable range of the saw unit 20 as known compound saws.

Figure 4:
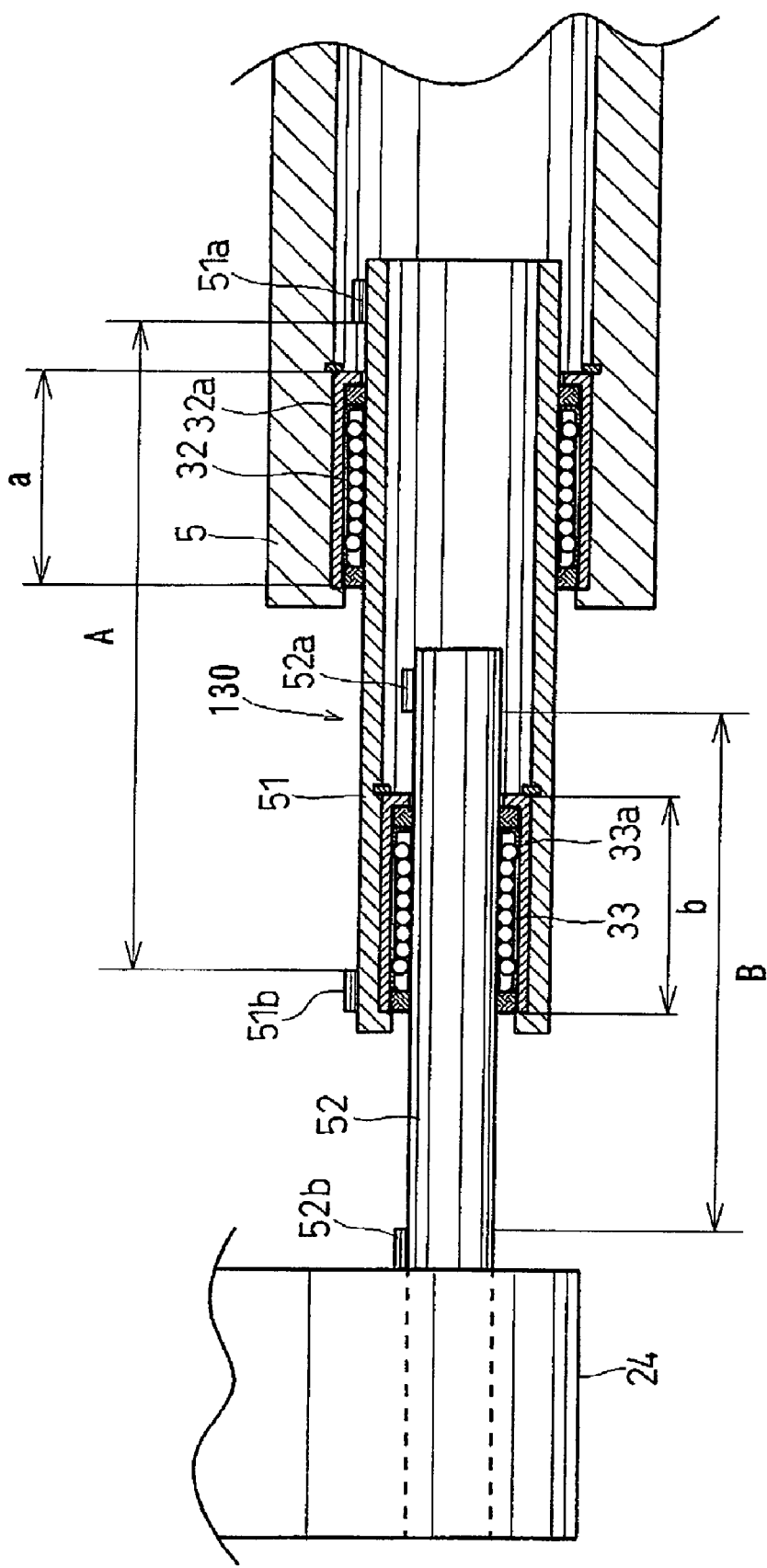
FIG. 4 is a vertical, cross-sectional view of a slide mechanism for a second representative slide compound saw.

A second representative slide mechanism 130 will now be described with reference to FIG. 4, in which the same reference numerals are utilized for the same elements as FIGS. 1-3. Because the slide mechanism 130 may be utilized with the saw 1 of FIGS. 1-3, a complete description of a saw including slide mechanism 130 is not necessary.

The second representative slide mechanism 130 may include a pair of first slide bars 51, which are preferably disposed in parallel. The first slide bars 51 preferably may be substantially hollow and cylindrical in cross section, although other configurations are, of course, possible with the present teachings. The front ends (right ends as viewed in FIG. 4) of the first slide bars 51 may be slidably mounted within the turntable 5 and may be slidably supported by first bearing members 32, which may include linear ball bearings as in the first representative embodiment.

A pair of second slide bars 52 preferably may have either a hollow or a solid cylindrical configuration, although other configurations are, of course, possible with the present teachings. The front ends (right ends as viewed in FIG. 4) of the second slide bars 52 may be slidably inserted into or received within the respective first slide bars 51 via second bearing members 33, which also may include linear ball bearings as in the first representative embodiment. Thus, the first slide bars 51 may be concentrically disposed with respect to the second slide bars 52. The arm holder 24 may be fixedly or rotatably secured to the rear ends of the second slide bars 52. Optionally, the arm holder 24 may be slidably supported by the second slide bars 52 in a manner similar to the arm holder 24 of the first representative embodiment in order to provide an additional sliding range (S3) of arm holder 24 (and thus saw unit 20) relative to the second slide bars 52.

Front and rear stoppers 51a and 51b may be attached to the outer periphery of each of the first slide bars 51. Further, the front and rear stoppers 51a and 51b may respectively oppose the front and rear ends of the outer casing 32a of the first bearing member 32 along the longitudinal direction of the first slide bars 51. The front and rear stoppers 51a and 51b define the maximum slidable distance (A) along the first slide bar 51. The length (a) of the first bearing member 32 must be subtracted from (A) in order to obtain the first movable or slidable range (S1) for the second representative embodiment. In other words, the first movable or slidable range (S1) of the first slide bars 51 relative to the turntable 5 may be defined as (A)-(a), i.e., the distance (A) between the front and rear stoppers 51a and 51b minus the length (a) of the first bearing member 32.

Similarly, front and rear stoppers 52a and 52b may be attached to or defined along the outer periphery of each of the second slide bars 52. Further, the front and rear stoppers 52a and 52b may respectively oppose the front and rear ends of the outer casing 33a of the second bearing member 33 along the longitudinal direction of the second slide bars 52. The front and rear stoppers 52a and 52b define the maximum slidable distance (B) along the second slide bar 52. The length (b) of the first bearing member 33 must be subtracted from the distance (B) in order to obtain the second movable or slidable range (S2) for the second representative embodiment. In other words, the second movable or slidable range (S2) of the second slide bar 52 relative to the turntable 5 may be defined as (B)-(b), i.e., the distance (B) between the front and rear stoppers 52a and 52b minus the length (b) of the second bearing member 33.

Similar to the first representative embodiment, the saw unit 20 of the second representative embodiment may be linearly moved or slid up to or within a combined distance (range) of S1 plus S2, because the first slide bars 51 can slide or move by a distance or range S1 relative to the turntable 5 and the second slide bars 52 can slide or move by a distance or range S2 relative to the first slide bars 51. Thus, in the second representative embodiment as well, the saw unit 20 can move in the horizontal (parallel) direction relative to the turntable 5 along two discrete slidable or movable ranges. Optionally, if the arm holder 24 is movably coupled to the second slide bars 52, as in the first representative embodiment, a third slidable range (S3) will be provided.

As a result, the combined sliding distance can be increased (e.g., at least up to S1 plus S2) while still maintaining a compact configuration for the saw 1. That is, it is not necessary to increase the length of slide bars 51 in order to provide a longer sliding range. Further, as in the first representative embodiment, the sliding movement may be performed in two discrete steps (i.e., first sliding by or up to the distance S1, stopping the sliding movement and then sliding by or up to the distance S2) or the sliding movement along or within the distance (range) S1 plus S2 (or S1 plus S2 plus optionally S3) may be performed in one continuous motion.

In the second representative embodiment, if the second slide bars 52 are inserted into the respective tubular-shaped, first slide bars 51, the saw unit 20 can telescopically extend and retract with respect to the turntable 5. Consequently, the slide mechanism 130 may have a relatively compact construction and may occupy a smaller space than the slide mechanism 30 of the first representative embodiment.

A third representative embodiment will now be described with reference to FIG. 5, in which the same reference numerals will be utilized for the same elements as the first and second representative embodiments. The slide compound saw 100 of the third representative embodiment is different from the first representative embodiment in that the arm holder 24 is fixedly secured to the rear ends of the (first) slide bars 31. Further, a slide support 61 and a pair of upper (second) slider bars 62 slidably support the saw unit 20 with respect to the arm holder 24. In the same manner as the first representative embodiment, the front ends of the (first) slide bars 31 may be slidably mounted within the turntable 5, and the first lock mechanism 41A may serve to releasably fix the position of the slide bars 31 relative to the turntable 5.

Figure 5:
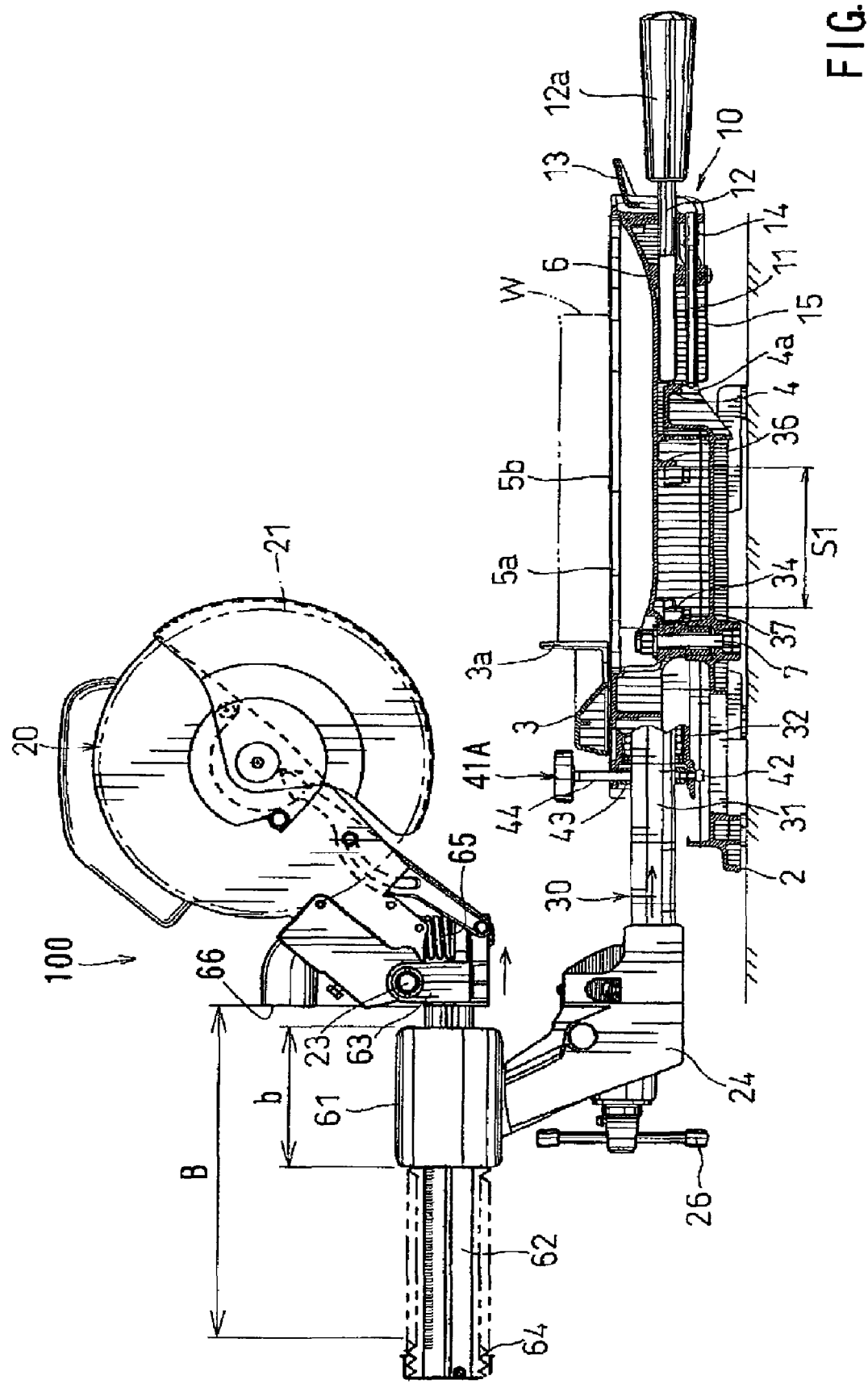
FIG. 5 is a broken-away side view of a third representative slide compound saw.

Although not shown in FIG. 5, a second bearing member and a second lock mechanism may be respectively utilized in a manner similar to the second bearing member 33 and the second lock mechanism 41B (including the auxiliary ring 43) of the first representative embodiment. For example, a second bearing member may be disposed within the slide support 61 in order to slidably support the upper slide bars 62. In this case, the upper slide bars 62 can slide horizontally relative to the arm holder 24 and can be releasably fixed or locked in position relative to the arm holder 24.

In addition, stoppers (not numbered) may be attached to or defined on the upper slide bars 62 in order to define the maximum movable or slidable distance (B) of the upper slide bars 62. In order to determine the movable or slidable range (S2) of the upper slide bars 62 relative to the arm holder 24, the length (b) of the arm holder 24 must be subtracted from the distance (B). Thus, the movable or slidable range (S2) of the upper slide bars 62 relative to the arm holder 24 may be defined as (B)-(b), i.e., the distance (B) between the stoppers disposed on the upper slide bars 62 minus the length (b) of the arm holder 24. The movable or slidable range (S1) of the first slide bars 31 relative to the turntable 5 can be defined simply as the distance between the stoppers 36 and 37 disposed on the first slide bars 31, because the first bearing member 32 is not disposed between the stoppers in this embodiment.

Optionally, the respective rear portions of the upper slide bars 62 optionally may be covered by a bellows-like dust cover 64 that can expand and contract. For example, the front end of the dust cover 64 may be attached to the rear end of the slide support 61 and the rear end of the dust cover 64 may be attached to the rear end of the corresponding upper slide bars 62.

A bracket 63 may be attached to the front ends of the upper slide bars 62. Further, the support rod 23 and the bracket 63 may pivotally support the saw unit 20. That is, the saw unit 20 may pivot or rotate towards the workpiece W via the bracket 63 and the support rod 23 (collectively, a hinge). Further, a return (coil) spring 65 may upwardly bias the saw unit 20 toward the uppermost or resting position. A dust duct 66 may be provided to direct dust away from the upper surface 5b and into, e.g., a dust collection receptacle (not shown).

As described above, according to the third representative embodiment, the saw unit 20 can move or slide by a distance S1 plus S2. That is, the (first) slide bars 31 can move or slide relative to the turntable 5 by the distance S1 and the upper (second) slide bars 62 can move or slide relative to the arm holder 24 by the distance S2. Thus, in the third representative embodiment, the saw unit 20 can move or slide relative to the turntable 5 by the sum (S1+S2) of the movable distance S1 of the slider bars 31 relative to the turntable 5 and the movable distance S2 of the upper slide bars 62 relative to the arm holder 24. Therefore, also in the third representative embodiment, the saw unit 20 can slide along a relatively large distance without increasing the size of the turntable 5. Optionally, the arm holder 24 may be movably coupled to the slide bars 31, as in the first representative embodiment, in order to define a third slidable range (S3) of the arm holder 24 relative to the slide bars 31.

Figure 6:
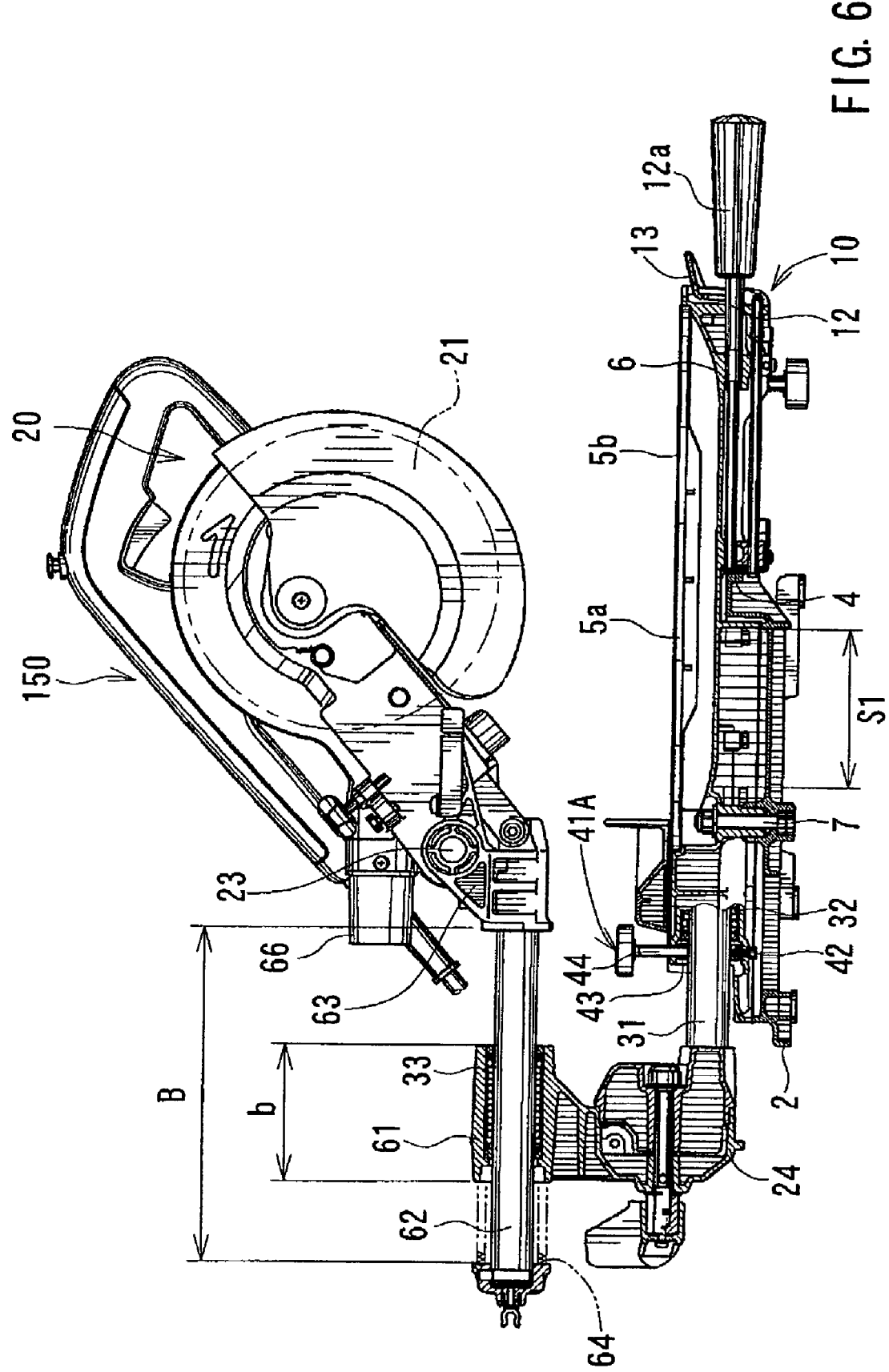
FIG. 6 is a broken-away side view of a fourth representative slide compound saw.
Figure 7:
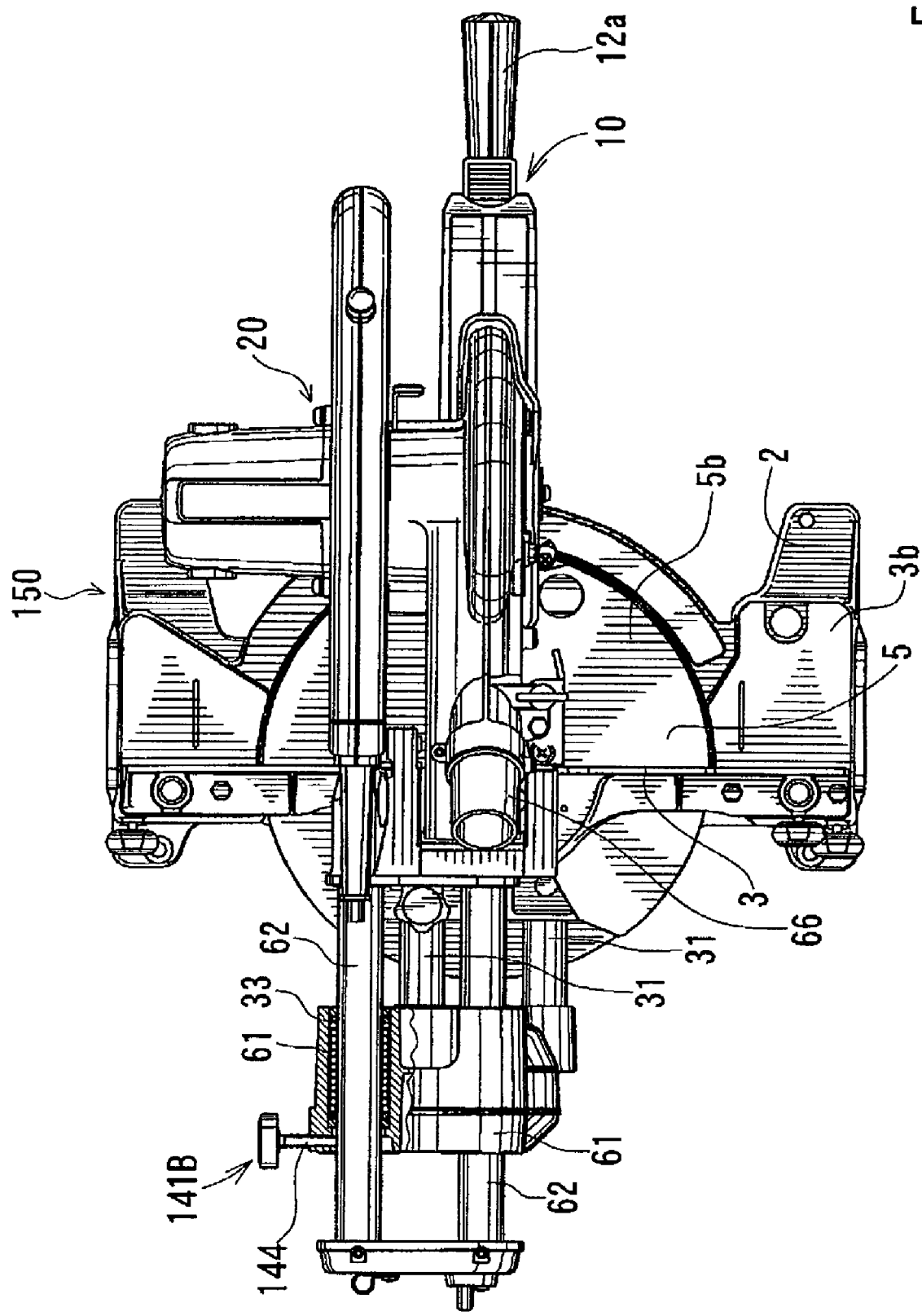
FIG. 7 is a broken away plan view of FIG. 6.

FIGS. 6 and 7 show a slide compound saw 150 according to fourth representative embodiment, which is a modification of the third representative embodiment. Like elements will therefore be given the same reference numerals as the third representative embodiment. As shown in FIG. 7, the fourth representative embodiment includes a second lock mechanism 141B. However, the second lock mechanism 141B does not incorporate the auxiliary ring 43 as in the second lock mechanism 41b of the first and second representative embodiments. Instead, the second lock mechanism 141B may include a lock screw 144 that directly engages or abuts the corresponding upper slide bar 62 without an intervening auxiliary ring. The upper slide bar(s) 62 preferably is (are) slidably disposed within second bearing mechanism 33.

This modification is advantageous because the second lock mechanism 141B can be manufactured at a lower cost than the lock mechanisms 41A or 41B. For example, slide compound saws according to the present teachings may optionally utilize the second lock mechanism 141B to prevent the holder arm 24 from moving or sliding in the axial (longitudinal) direction relative to the upper slide support 61. On the other hand, the first lock mechanism 41A must bear the torsional force that is applied to the slide bars 31 when a bevel cutting operation is performed with the saw unit 20 disposed in a position inclined from the vertical orientation. Therefore, the first lock mechanism 41A is preferably sufficiently resilient to withstand this force.

Optionally, the arm holder 24 of the fourth representative embodiment also may be movably coupled to the slide bars 31, as in the first representative embodiment, in order to define a third slidable range (S3) of the arm holder 24 relative to the slide bars 31.

Although the above representative embodiments have been described in connection with circular slide compound saws that provide both oblique (miter) and bevel cutting functions, the present teachings also may be applied to other types of slide saws that do not provide these functions. For example, the present teachings may be applied to slide saws that include only a miter cutting function or only a bevel cutting function. Naturally, neither the miter function nor the bevel function is required according to the present teachings.

In addition, the number and the cross-sectional configuration of the first and second slide bars 31, 51, 52 or 62 may be selectively and suitably determined. For example, the present teachings are not limited to cylindrical-shaped slide bars, as polygonal-shaped bars (e.g., rectangular-shaped bars) also may be utilized. In addition, as noted in the second, third and fourth representative embodiments, the saw unit 20 may move or slide along three or more discrete slidable ranges. That is, three or more sets of sliding distances (e.g., S1, S2 and S3) optionally made be utilized with the present teachings.

Figure 8:
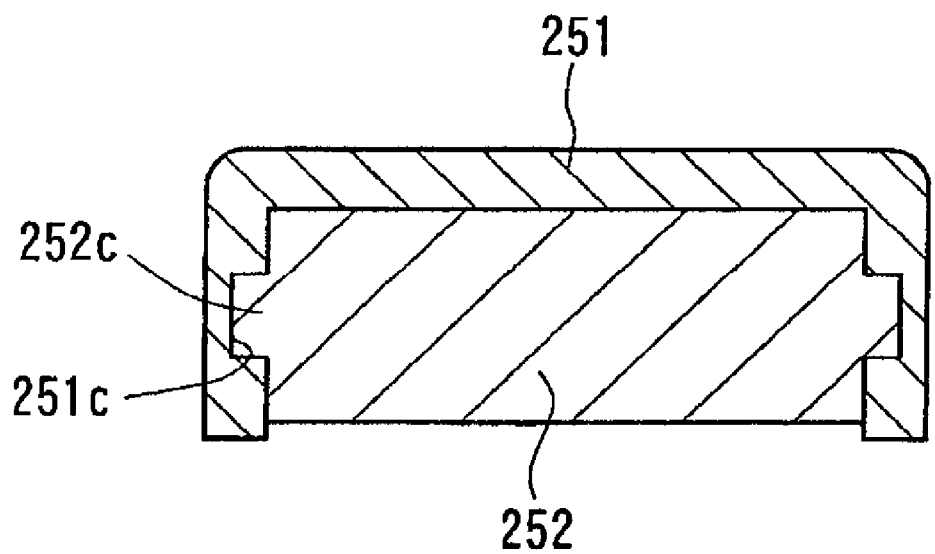
FIG. 8 is a cross-sectional view of an alternative configuration of the slide mechanism of FIG. 4.

Further, as noted in the second representative embodiment, the first slide bars 51 may have a hollow and cylindrical configuration and the second slide bars 52 may have a hollow or solid cylindrical configuration. However, variety of configurations for the first and second slide bars 51 and 52 may be utilized. For example, as shown in FIG. 8, a slide bar 251 (i.e., corresponding to the first slide bar 51) may have a substantially inverted U-shaped configuration in cross section. In addition, a slide bar 252 (i.e., corresponding to the second slide bar 52) may have a substantially rectangular configuration in cross section. Preferably, the configuration of slide bar 252 corresponds, or substantially corresponds, to the inner peripheral configuration of the slide bar 251. Thus, in this case as well, the slide bar 252 can telescopically project from the slide bar 251.

In another representative modification of the present teachings, a pair of recesses 251c may be defined within the lateral inner surfaces of the slide bar 251. The recesses 251c may oppose or face each other. A projection 252c may be extend from each lateral surface of the slide bar 252 in order to slidably engage the corresponding recesses 251c of the slide bar 251. Therefore, the slide bar 251 can slide relative to the slide bar 252 along the longitudinal direction guided by the projections 252c and recesses 251c.

Figure 9:
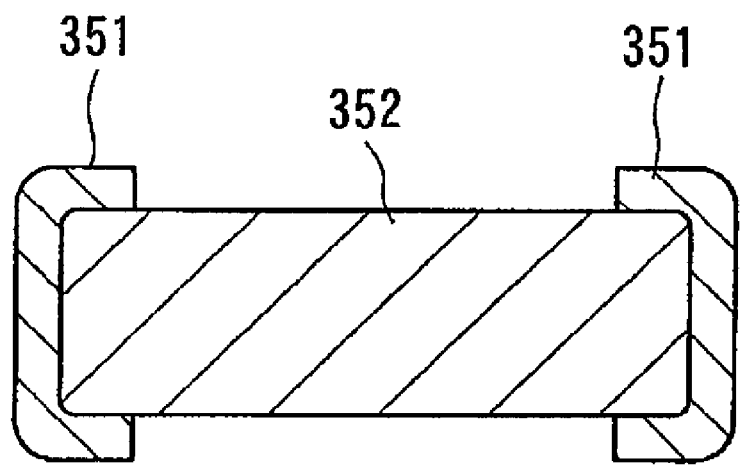
FIG. 9 is a cross-sectional view of a further alternative configuration of the slide mechanism of FIG. 4.

In the alternative, as shown in FIG. 9, a pair of slide bars 351 (i.e., corresponding to the first slide bar 51) may have a substantially C-shaped configuration in cross section. Further, a slide bar 352 (i.e., corresponding to the second slide bar 52) may have a substantially rectangular configuration and may be slidably received between the slide bars 351. Therefore, the slide bar 351 can slide relative to the slide bar 352 along the longitudinal direction Furthermore, it is noted that the arm holder 24 of the third representative embodiment can slide relative to the turntable 5 via the slide bars 31 and the saw unit 20 can slide relative to the arm holder 24 via the upper slide bars 62. As discussed above, this two-step movable construction between the arm holder 24 and the turntable 5 as in the first or second representative embodiments also may be incorporated into the third or fourth representative embodiments in order to provide three or more discrete moveable or slidable distances (ranges).

In a further embodiment of the present teachings, the first slide bar 31 may be fixedly coupled to the table 3b or the turntable 5. An arm 24 may be movably coupled to the first slide bar 31, as in the first representative embodiment, thereby defining a first slidable distance or range (S1) between the arm 24 and the first slide bar 31. A slide support 61 may be coupled to the arm 24, as in the third and representative fourth embodiments, and may slidably support at least one upper (second) slide bar 62. The saw unit may be coupled to the upper (second) slide bar 62. In this case, the upper slide bar 62 may be slidable with respect to the slide support 61, thereby defining a second slidable distance or range (S2) between the arm 24 (or the slide support 61) and the saw unit 20.

The invention claimed is:

1. A slide compound saw comprising:
a table defining a horizontal table surface,
a saw unit having a saw blade,
two first slide bars slidably coupling the table to the saw unit, and
two second slide bars slidably coupling to the two first slide bars to the saw unit, wherein the two first slide bars are disposed substantially parallel to the two second slide bars and the saw unit is arranged and constructed to slide in a direction substantially parallel to the table surface (1) via the two first slide bars along a first discrete slidable range and (2) via the two second slide bars along a second discrete slidable range,
wherein the two first slide bars are coupled with the table,
wherein the saw unit is coupled to the two second slide bars so as to be non-rotatable relative to the two second slide bars about an axis parallel to the sliding direction,
wherein the two second slide bars are spaced from the first slide bars in a direction substantially perpendicular to the table surface.

2. A slide compound saw as in claim 1, further comprising an arm support coupled to the second slide bar, the arm support comprising means for laterally pivoting the saw unit relative to the table surface, thereby enabling bevel cutting operations.

3. A slide compound saw as in claim 2, wherein the arm support is fixedly coupled to the two first slide bars.

4. A slide compound saw as in claim 2, further including a first set of stoppers defining the first discrete slidable range of the saw unit relative to the table and a second set of stoppers defining the second discrete slidable range of the second slide bar relative to the arm support.

5. A slide compound saw as in claim 3, wherein the second slide bar is slidably disposed within the arm support.

6. A slide compound saw as in claim 1, wherein the saw unit is hingedly connected via at least the second slide bar so as to pivot towards and away from the table surface.

7. A slide compound saw as in claim 6, further including an arm support that comprises means for laterally inclining the saw unit relative to the table surface.

8. A slide compound saw as in claim 1, further comprising linear ball bearings slidably supporting the first and second slide bars.

9. A slide compound saw as in claim 1, comprising at least two second slide bars that extend substantially in parallel to each other.

10. A slide compound saw as in claim 1, wherein the coupling between the two first slide bars and the table is a slidable coupling.

11. A slide compound saw comprising:
a table defining a table surface,
a saw unit rotatably supporting a circular saw blade,
first and second slide mechanisms each arranged and constructed to permit the saw unit to move in a direction substantially parallel to the table surface,
a first slide bar slidably supporting the saw unit relative to the table,
an arm holder fixedly supported on the first slide bar, and
two parallel second slide bars supported on an arm;
wherein the first slide mechanism slidably couples the table to the first slide bar and defines a first slidable range of the first slide bar relative to the table, and the second slide mechanism slidably couples the arm to the second slide bars and defines a second slidable range of the arm holder relative to the second slide bars,
wherein the saw unit is fixed with regard to relative rotation between the saw unit and the arm about an axis parallel to the direction substantially parallel to the table surface, and
wherein the table is fixed with regard to relative rotation between the table and the arm holder about an axis parallel to the direction substantially parallel to the table surface.

12. A slide compound saw as in claim 11, wherein the arm is releasably lockably coupled to the arm holder so as to be rotatable about an axis parallel to the direction substantially parallel to the table surface.

13. A slide compound saw as in claim 12, wherein the saw unit is hingedly connected to the arm so as to be pivotable towards and away from the surface of the table about an axis orthogonal to the direction substantially parallel to the table surface.

14. A slide compound saw, comprising:
   a table defining a table surface,
   a saw unit,
   two first slide bars,
   two second slide bars,
   a bevel arm support comprising,
      an arm holder,
      an arm,
      wherein the arm is supported by the arm holder,
   a slide mechanism comprising,
      a first slide mechanism slidably coupling the arm holder to the table via the two first slide bars in a direction substantially parallel to the table surface within a first discrete sliding range (S1),
      a second slide mechanism slidably coupling the arm to the saw unit via the two second slide bars in the direction substantially parallel to the table surface within a second discrete sliding range (S2),
   wherein the arm holder extends between the two first slide bars and maintains a distance therebetween; and
   wherein the arm extends between the two second slide bars and maintains a distance therebetween.

15. A slide compound saw, comprising:
   a table defining a table surface,
   a saw unit,
   two first slide bars,
   two second slide bars,
   a bevel arm support comprising,
      an arm holder,
      an arm,
      wherein the arm is supported by the arm holder,
   a slide mechanism comprising,
      a first slide mechanism slidably coupling the arm holder to the table via the two first slide bars in a direction substantially parallel to the table surface,
      a second slide mechanism slidably coupling the arm to the saw unit via the two second slide bars in the direction substantially parallel to the table surface,
   wherein the arm is pivotally connected to the arm holder such that the arm is rotatable about an axis parallel to the direction substantially parallel to the table surface,
   wherein the saw unit is pivotally connected to the two second slide units such that the saw unit is rotatable about an axis perpendicular to the direction substantially parallel to the table surface,
   wherein the arm holder extends between the two first slide bars and maintains a distance therebetween; and
   wherein the arm extends between the two second slide bars and maintains a distance therebetween.

* * * * *